United States Patent Office 3,242,648
Patented Mar. 29, 1966

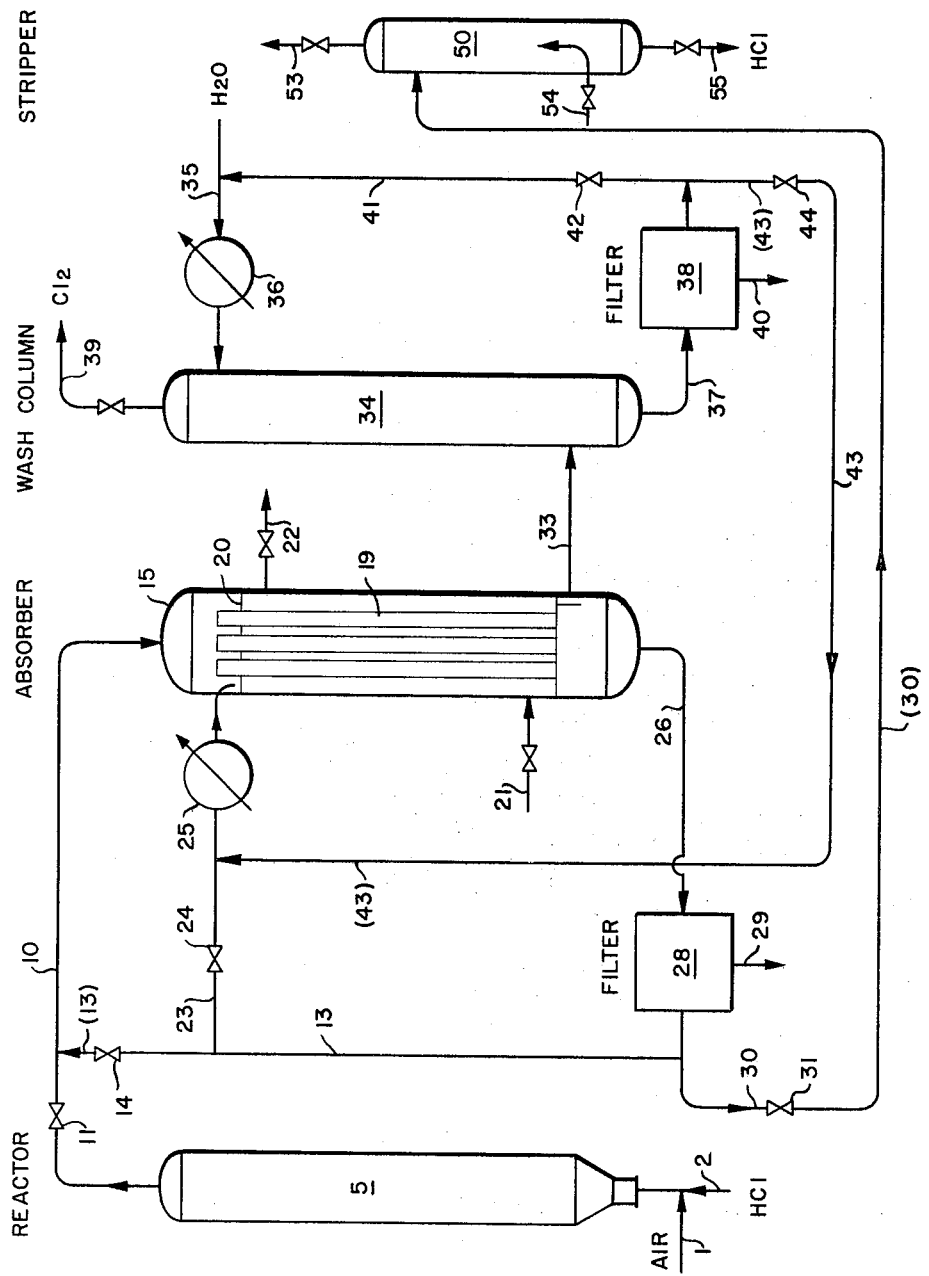

3,242,648
PROCESS FOR RECOVERY OF HYDROGEN
CHLORIDE AND CHLORINE
Terence E. Young, The Hague, Netherlands, Charles H. Rivers, New York, N.Y., and Maria M. J. J. Starmans, Amsterdam, Netherlands, assignors to Shell Oil Company, New York, N.Y., a corporation of Delaware
Filed Apr. 5, 1963, Ser. No. 270,939
Claims priority, application Netherlands, Apr. 9, 1962, 276,976
2 Claims. (Cl. 55—71)

This invention relates to an improvement in the recovery of products comprising chlorine and hydrochloric acid from gaseous reaction mixtures containing chlorine and hydrogen chloride in admixture with water vapor, normally gaseous materials and organic impurities. The invention relates more particularly to the recovery of chlorine and aqueous hydrogen chloride in a high state of purity from reaction mixtures produced by reacting hydrogen chloride containing organic impurities with oxygen in the presence of a solid catalyst at temperatures below 450° C.

The process of the invention is applied broadly to the recovery of chlorine and aqueous hydrogen chloride in a high state of purity from gaseous mixtures containing chlorine and hydrogen chloride in admixture with normally gaseous materials, water vapor and organic contaminants obtained at elevated temperatures. Essentially chlorine- and gaseous hydrogen chloride-containing mixtures of this type, contaminated by the presence of organic impurities, are obtained in the industry, often at elevated temperatures, as desired products or as by-product streams, particularly in processes wherein chlorine and water vapor producing conditions are present. Organic contaminants encountered therein may comprise, for example, organic components and halogen-, sulfur- and oxygen-containing organic components solidifying at relatively low temperatures, for example, below about 50° C.

The invention is applied with particular advantage to the recovery of chlorine and aqueous hydrogen chloride, free of any substantial amounts of organic impurities, from the impure, hot, gaseous reaction mixtures obtained in the production of chlorine by the reaction of hydrogen chloride, containing organic impurities, with oxygen, or an oxygen-containing gas, in the "low temperature catalytic hydrogen chloride oxidation process" executed at temperatures below 450° C. and generally below about 400° C.

The process referred to herein as the low temperature catalytic hydrogen chloride oxidation process is that described and claimed in copending application Serial No. 83,134 filed January 17, 1961 now U.S. Patent No. 3,210,-158 issued October 5, 1965, wherein hydrogen chloride is reacted with an oxygen-containing gas at a temperature below 450° C., and preferably below about 400° C., in the presence of a catalyst comprising a copper compound, for example, copper chloride, in combination with at least one compound, for example, the chloride of the rare earths (among which are included scandium, yttrium, zirconium, thorium and uranium), and at least one compound, for example, the chloride of an alkali metal. A unique feature of the low temperature catalytic hydrogen chloride oxidation process, attributable to the combination catalyst employed therein, is the ability to attain very high conversions of hydrogen chloride and oxygen to chlorine and water at unusually low temperatures for this reaction with exceedingly long catalyst life.

Hydrogen chloride available as charge material to the process, however, often contains organic impurities such as, for example, hydrocarbons, and halogenated hydrocarbons. Under the conditions prevailing in the low temperature hydrogen chloride oxidation process, organic impurities present in the charge thereto will react to form chlorinated products. The reaction mixture obtained will therefore comprise, in addition to chlorine and hydrogen chloride, chlorine-containing organic materials originally present in the charge or formed within the system. The presence of these contaminants is often highly undesirable. The amount of chlorinated contaminants present in the reaction mixture will generally increase with decrease in reaction temperature. At temperatures in the neighborhood of 450° C. and higher, these organic contaminants are decomposed to predominantly normally volatile products. At such high temperatures, however, the favorable equilibrium conditions enabling high conversion of hydrogen chloride are not attainable. In addition, at the temperatures of 450° C. and higher, corrosion and catalyst volatility are increased inordinately.

The present invention provides a process in which the advantage of a relatively low reaction temperature in the oxidation of hydrogen chloride is retained—an advantage which caan be realized only with the use of catalysts of the above-mentioned composition—and in which, in addition, the chlorinated organic compounds are, simply, yet effectively, removed from the reaction mixture.

In accordance with the present invention, chlorine and aqueous hydrogen chloride are recovered in a high state of purity from hot, gaseous mixtures, such as, for example, those obtained in the low temperature hydrogen chloride oxidation process, containing hydrogen chloride in admixture with chlorine, water vapor, fixed gas and organic impurities, by quenching said hot gaseous mixtures with water or aqueous hydrogen chloride, contacting said quenched mixture in concurrent flow with aqueous hydrogen chloride in an absorption zone at a temperature sufficiently low to effect the selective solidification of at least a substantial part of said organic impurities, thereby separating a liquid phase comprising aqueous hydrogen chloride and suspended solid organic impurities from a gaseous phase comprising chlorine and fixed gas free of any substantial amount of said organic impurties in said absorption zone, separating chlorine free of any substantial amount of said organic impurities from said gaseous phase, and separating said solid organic impurities from said liquid phase. In a preferred embodiment of the invention, a tubular falling film contactor, wherein said quenched reaction mixture is brought into direct contact with a concurrently flowing film of aqueous hydrogen chloride which is in indirect contact with a cooling medium is employed.

In order to set forth more fully the nature of the invention, it will be described hereinafter in detail with reference to the attached drawing, wherein the single figure represents more or less diagrammatically, an elevational view of one form of apparatus for carrying out the process of the invention.

*Example*

Referring to the attached drawing: Hydrogen chloride gas, containing organic impurities, emanating from an outside source through line 2, is combined with air, introduced through line 1, and the mixture subjected to oxidative conversion conditions in a suitable reaction zone, for example a reactor 5, to effect the oxidative conversion of hydrogen chloride to chlorine. Suitable oxidative reaction conditions comprise those described and claimed in copending U.S. application Serial No. 83,134 above referred to, including, for example, the presence of a catalyst consisting essentially of a mixture of copper chloride-potassium chloride-didymium chloride and a suitable solid support, such as finely divided silica, and a temperature in the range of about 300–400° C. The hydrogen chloride charged to the process may emanate from any suitable source. It may, for example, be a product stream obtained in any of many processes involving thermal and/or catalytic processes wherein hydrogen chloride is introduced or produced, including chlorination, hydrochlorination, dehydrochlorination, dechlorination, etc. of organic compounds. Thus the hydrogen chloride contaminated with organic compounds, which is the starting material for the preparation of the mixtures that are treated according to the invention, may, for example, be hydrochloric acid produced in the pyrolysis of dichloroethane or dichloropropane, or else in the chlorination of various hydrocarbons by substitution.

Reactor effluent, comprising unconverted hydrogen chloride in admixture with water vapor, chlorine, fixed gases including oxygen, nitrogen, oxides of carbon, as well as organic impurities is passed from reactor 5 through line 10, provided with valve 11, into a suitable absorption zone. The absorption zone may comprise a suitable falling film absorber 15.

Thus, in a typical operation a gaseous stream of 5804.5 kg./hour, obtained by the catalytic oxidative conversion of hydrogen chloride, containing organic impurities, with air in reactor 5, at 365° C. in the presence of a catalyst containing chlorides of copper in combination with potassium chloride and didymium (mainly lanthanum and neodymium) chloride, and discharge therefrom into line 10, is found to have the following composition in parts by weight:

| | |
|---|---|
| HCl | 658.9 |
| $H_2O$ | 519.3 |
| $C_2Cl_6$ | 47.4 |
| $O_2$ | 109.7 |
| $N_2$ | 1952.2 |
| $CO_2$ | 35.2 |
| $Cl_2$ | 1897.8 |
| $CCl_4$ | 9.2 |
| | 5229.7 |

In passing through line 10 the gaseous mixture is quenched with aqueous hydrogen chloride emanating from within the system, through valved line 13 discharging into line 10. Thus the gaseous mixture flowing through line 10 is cooled from 365° C. to 95° C. by quenching with 574.8 kg./hour of hydrochloric acid of 30.5% concentration (175.3 HCl+399.5 $H_2O$) of 40° C., supplied through line 13, the hydrochloric acid so added as quench being totally evaporated. The gaseous mixture entering absorber 15 now contains 834.2 kg./hour of HCl and 918.8 kg./hour of $H_2O$ and its composition is unaltered as regards the other components so that the total gas stream is now 5804.5 kg./hour.

The absorber 15 of the falling film type may suitably comprise a plurality of tubes 19 projecting through plate 20 in the upper part of the absorber. The exterior surface of the tubes is in direct contact with a cooling medium introduced through valved line 21 and withdrawn through valved line 22. A suitable cooling medium comprises water. The quenched gaseous mixture entering through line 10, into absorber 15, passes downwardly through tubes 19 in concurrent flow with aqueous hydrogen chloride, emanating from within the system through line 23, provided with valve 24 and cooler 25. The aqueous hydrogen chloride (dilute hydrochloric acid) entering absorber 15, above plate 20, overflows into tubes 19 to provide a falling film of aqueous hydrogen chloride in tubes 19.

As the reaction mixtures under consideration are very corrosive, the apparatus should be made of corrosion-resistant material. For this purpose, graphite has proved very satisfactory, although graphite is chosen in the present illustrative description, other suitable materials, for example, glass, tantalum and certain plastics such as polyethylene, Teflon and polyvinyl chloride can be used as construction material. Steel surfaces provided with protective layers, for example, layers of the above-mentioned plastics, can also generally be used.

In passing through tubes 19, the contents thereof are cooled to effect the selective solidification of at least a substantial part of the organic impurities. The specific temperature preferably employed will vary in accordance with the specific impurities present. In general, temperatures below about 50° C. and as low as somewhat above 0° C. are employed. Temperatures in the range of from about 10° C. to about 40° C. are generally satisfactory. The temperature conditions within tubes 19 are obtained by judicious control of the cooling medium introduced by means of valved line 21 and optionally by other conventional means not shown in the drawing.

Hydrogen chloride is absorbed in the aqueous hydrogen chloride resulting in a fortification of the aqueous hydrogen chloride in its passage downwardly through tubes 19. The liquid phase leaving tubes 19 may generally have a HCl concentration of from about 5 to about 40% by weight.

The concentration of the HCl in the aqueous stream entering absorber 15 through line 23 may be controlled, for example, by blending acids of various concentrations produced within the system and optionally by further dilution with water by means not shown in the drawing.

The rate of flow through tubes 19 of the aqueous hydrogen chloride is controlled so that the impurities crystallized out will not deposit upon the inner walls of tubes 19 but will be entrained in the liquid flow. With a sufficient rate of flow, therefore, any blockage of the tubes is forestalled. Suitable rates are, for example, from about 3 to about 10 liters of hydrochloric acid or more per cm. cross-sectional circumference of the tube per hour. For a tube with a diameter of 10 mm., this is the equivalent of about 9.4 to 31.4 (or more) liters of hydrochloric acid per hour.

In order to limit the quantities of liquid needed to produce certain rates of flow, the hydrochloric acid can be recycled; that is to say, the hydrochloric acid leaving the bottom end of the tubes 19 can be fed back into the top end of the absorber by means of lines 13 and 23. Hydrogen chloride from the gaseous reaction mixture entering tubes 19 is dissolved in the dilute hydrochloric acid. In this way, the concentration of the hydrochloric acid can increase considerably in the course of successive cycles. However, part of the circulating stream of hydrochloric acid can also be withdrawn, continuously or intermittently and replaced by the same volume of a more dilute hydrochloric acid or water; in this way, it is possible to arrive at more or less constant operating conditions. The more dilute hydrochloric acid in question can be obtained by water-washing the chlorine that has left the absorber 15 as described hereinbelow. As a rule, it will be desirable for most of the hydrochloric acid leaving the tubes 19 to be kept in circulation. In certain cases, this will amount to about 80 to 90% of the liquid passing through the tubes.

In the present illustrative description, there are introduced into absorber 15 6,900 kg./hr. of hydrochloric acid containing 30.5% by weight HCl at a temperature of 40° C., emanating through lines 13 and 23; and an additional 1184.5 kg./hr. of hydrochloric acid containing 12.79% by weight of HCl at 48° C. emanating through lines 43 and 23. The gaseous mixture flowing through line 10 entered tubes 19 at 95° C. The tube (19) bundle comprises 160 vertically arranged graphite tubes, 4.2 m. long with an internal diameter of 25 mm. The effluence from the water-cooled tubes 19 has a temperature of 40° C. and comprised 4203.7 kg./hr. of a gaseous phase having the following composition in parts by weight:

| | |
|---|---|
| $H_2O$ | 32.0 |
| HCl | 143.2 |
| $C_2Cl_6$ | 24.4 |
| $O_2$ | 109.7 |
| $N_2$ | 1952.2 |

| | |
|---|---:|
| $CO_2$ | 35.2 |
| $Cl_2$ | 1897.8 |
| $CCl_4$ | 9.2 | and 9685.3 kg./hr. of liquid phase consisting of aqueous hydrogen chloride containing 30.5% by weight HCl and 23.0 kg./hr. of crystallized $C_2Cl_6$.

The gaseous phase is passed from the lower part of absorber 15, through line 33 into a wash column 34.

The liquid phase is passed from absorber 15 through line 26 to a suitable solids separating zone, for example, a filter 28. Within filter 28 the solids consisting essentially of 23.0 kg./hr. of $C_2Cl_6$ are filtered from the liquid phase. The solids, consisting essentially of $C_2Cl_6$, so separated are removed from the system by suitable means represented by line 29. The liquid phase (filtrate) consisting essentially of 30.5% strength hydrochloric acid is taken from filter 28 through line 30 provided with valve 31. Of the stream flowing through line 30, 6,900 kg./hr. are recycled through lines 13 and 25 to the upper part of absorber 15; 574.8 kg./hr. are passed as quench through valved line 13 into line 10; the remaining 2187.5 kg./hr. of filtrate passing through line 30, constituting a final product, may be removed from the system as such or passed to a suitable stripping zone, for example, stripper 50, wherein it is stripped with a stream of air entering through valved line 54 to remove any residual amounts of chlorine therefrom. Gas consisting essentially of air and chlorine leaves the upper part of stripper 50 through valved line 53. Liquid phase consisting of hydrochloric acid (30.5% wt. concentration) of high purity containing no detectable amount of organic impurities is withdrawn as a final product from the lower part of stripper 50 through valved line 55.

Column 34, receiving the gaseous phase from absorber 15 through line 33, consisted, in the present illustrative description, of a column 7 meters in height with a diameter of 0.61 m., having 16 trays. In column 34 the gaseous phase is washed with aqueous hydrogen chloride. To this effect, there was introduced through line 35, provided with cooler 36, into the upper part of the column: 1021.6 kg./hr. of water, cooled to 12° C., in which 8.3 kg./hr. of HCl had been dissolved and 2000 kg./hr. of dilute hydrochloric acid of 12.79% concentration emanating through line 41.

Dilute hydrochloride acid having a concentration of 12.79% by weight and a temperature of 48° C. is removed from the bottom of column 34, through line 37, at the rate of 3184.5 kg./hr. and introduced into a suitable solids separating zone, for example, a filter 38. In passing through filter 38, 20.8 kg./hr. of solid organic impurities consisting essentially of $C_2Cl_6$ are filtered off and removed from the system by suitable means represented in the drawing by line 40. The filtrate leaving filter 38 is passed through line 43, provided with valve 44 into line 23, at the rate of 1184.8 kg./hr. The remaining 2000 kg./hr. of filtrate leaving filter 38 through line 43 is by-passed through line 41, provided with valve 42, into line 35 discharging into the upper part of column 34.

Gaseous overhead leaving column 34 through valved line 39 at the rate of 4028.3 kg./hr. had the following composition in parts by weight:

| | |
|---|---:|
| $H_2O$ | 20.6 |
| $O_2$ | 109.7 |
| $N_2$ | 1952.2 |
| $CO_2$ | 35.2 |
| $Cl_2$ | 1897.8 |
| $CCl_4$ | 9.2 |
| $C_2Cl_6$ | 3.6 |

Chlorine was recovered from this overhead from column 34 by cooling.

The invention is of particular value when applied to the process for the production of chlorine by oxidation of hydrogen chloride containing organic impurities. Comprised within the scope of the invention is the purification of hydrochloric acid containing organic impurities. In the latter case, only sufficient oxygen or oxygen-containing gas is added to the impure hydrochloric acid charged to the reaction zone containing the catalyst comprising compounds of copper in combination with compounds of rare earth and alkali metals, to assure the formation of substantially no greater amount of chlorine in the reaction zone than will react with the organic contaminants.

Parts of apparatus, such as pumps, valves, storage vessels, etc., not essential to a complete understanding of the invention have been omitted from the drawing and the detailed description for the sake of simplicity. It is to be understood that conventional means may be resorted to to obtain and maintain the conditions of temperature prescribed herein for the various phases of the process.

It is furthermore pointed out that modifications may be made in the specific form of apparatus and operating conditions described without departing from the spirit and scope of the presently claimed invention. Thus, though filtration is restorted to to effect the separation of solidified organic impurities with the use of filters 28 and 38 in the above-described illustrative description of the invention, other conventional means such as, for example, centrifuging, may be employed to obtain the solids separation. Filters made of ceramic materials or plastics, such as, for examyle, polyethylene or Teflon, are suitable. If required, a flotation process can also be applied for this purpose, or else an extraction process with suitable solvents, for example, hydrocarbons or chlorinated hydrocarbons.

Catalyst components entrained from reactor 5 may be removed from the gaseous mixture before subjection to the absorption in absorber 15 should this be found desirable. A suitable method for effecting such initial catalyst separation comprises that described and claimed in copending application Serial No. 270,622, filed April 4, 1963.

We claim as our invention:

1. The process for recovering chlorine and hydrochloric acid substantially free of $C_2Cl_6$ from a hot gaseous mixture consisting essentially of chlorine in admixture with hydrogen chloride, water vapor, inert gas and chlorinated hydrocarbons consisting essentially of $C_2Cl_6$ and $CCl_4$, obtained by catalytic reaction of hydrogen chloride containing organic contaminants with oxygen-containing gas at temperatures below 400° C., which consists essentially of quenching said gaseous mixture with aqueous hydrochloric acid, contacting the quenched mixture, in vapor phase, with a concurrently flowing liquid film of dilute aqueous hydrochloric acid in an externally cooled, elongated absorption zone of restricted cross-sectional area, at a temperature of from about 0 to about 50° C., thereby crystallizing out $C_2Cl_6$ while absorbing hydrogen chloride in said dilute aqueous hydrochloric acid with the formation of a gaseous phase comprising chlorine, hydrogen chloride, $CCl_4$ and inert gas and a liquid phase comprising hydrochloric acid and suspended solid $C_2Cl_6$ in said absorption zone, separating chlorine from said gaseous phase, separating said suspended solid $C_2Cl_6$ from said liquid phase, and recycling a part of said liquid phase free of any substantial amount of $C_2Cl_6$ to the inlet of said absorption zone.

2. The process for recovering chlorine and hydrochloric acid substantially free of $C_2Cl_6$ from hot gaseous mixtures consisting essentially of chlorine in admixture with hydrogen chloride, water vapor, inert gas and chlorinated hydrocarbons consisting essentially of $C_2Cl_6$ and $CCl_4$, obtained by catalytic reaction of hydrogen chloride containing organic contaminants with oxygen-containing gas at temperatures below 400° C., which consists essentially of quenching said gaseous mixture with aqueous hydrochloric acid, contacting the quenched gaseous mixture with a concurrently flowing liquid film of dilute aqueous hydrochloric acid in an externally cooled, elongated absorption zone of restricted cross-sectional area, maintained at a temperature of from about 10 to about 40° C., thereby crystallizing out $C_2Cl_6$ while absorbing hydrogen chloride in said dilute hydrochloric acid with the formation of a gaseous phase comprising chlorine, hydrogen chloride, $CCl_4$ and inert gas and a liquid phase comprising hydrochloric acid and suspended solid $C_2Cl_6$ in said absorption zone, separating chlorine from said gaseous phase, separating said suspended solid $C_2Cl_6$ from said liquid phase, and using a part of said liquid phase free of $C_2Cl_6$ to effect said quenching of said gaseous mixture.

References Cited by the Examiner

UNITED STATES PATENTS

| | | | |
|---|---|---|---|
| 2,345,696 | 4/1944 | Benning et al. | 55—71 |
| 2,644,846 | 7/1953 | Johnson et al. | 55—71 X |
| 2,730,194 | 1/1956 | Wohlers et al. | 23—154 |
| 2,909,240 | 10/1959 | Colton | 55—71 |
| 3,061,652 | 10/1962 | Cayton et al. | 260—652 |
| 3,079,231 | 2/1963 | Draper et al. | 23—154 |
| 3,085,860 | 4/1963 | Jacobowsky et al. | 23—154 |
| 3,120,568 | 2/1964 | Brown | 55—71 X |

REUBEN FRIEDMAN, *Primary Examiner.*

B. NOZICK, *Assistant Examiner.*